United States Patent [19]

Hickey

[11] Patent Number: 5,150,842
[45] Date of Patent: Sep. 29, 1992

[54] MOLDED FUEL INJECTOR AND METHOD FOR PRODUCING

[75] Inventor: John C. Hickey, Ypsilanti, Mich.

[73] Assignee: Ford Motor Company, Dearborn, Mich.

[21] Appl. No.: 615,835

[22] Filed: Nov. 19, 1990

[51] Int. Cl.⁵ .............................................. B05B 1/30
[52] U.S. Cl. ............................ 239/585.4; 251/129.21
[58] Field of Search ............... 239/585; 251/129.15, 251/129.21, 366; 336/96

[56] References Cited

U.S. PATENT DOCUMENTS

| | | | |
|---|---|---|---|
| 2,721,100 | 10/1955 | Bodine, Jr. | 251/129.21 |
| 4,393,994 | 7/1983 | Rieck | 251/129.15 |
| 4,405,912 | 9/1983 | Palma et al. | 335/260 |
| 4,509,693 | 4/1985 | Nakai | 239/585 |
| 4,585,176 | 4/1986 | Kubach et al. | 239/585.1 |
| 4,660,770 | 4/1987 | Gieseking | 239/585 |
| 4,712,582 | 12/1987 | Marks | 251/129.15 |
| 4,753,416 | 6/1988 | Inagaki et al. | 251/129.15 |
| 4,875,658 | 10/1989 | Asai | 251/129.15 |

*Primary Examiner*—Andres Kashnikow
*Assistant Examiner*—Christopher G. Trainor
*Attorney, Agent, or Firm*—Allan J. Lippa; Peter Abolins

[57] ABSTRACT

A fuel injector having major components formed by an injection molding process. A coil bobbin assembly is positioned within a magnetic permeable core. An injection molding process provides a plastic housing with the magnetic core and coil bobbin assembly hermetically sealed therein. The molding process also provides a fuel passageway through, and hermetically sealed from, the magnetic core an coil bobbin assembly.

9 Claims, 4 Drawing Sheets

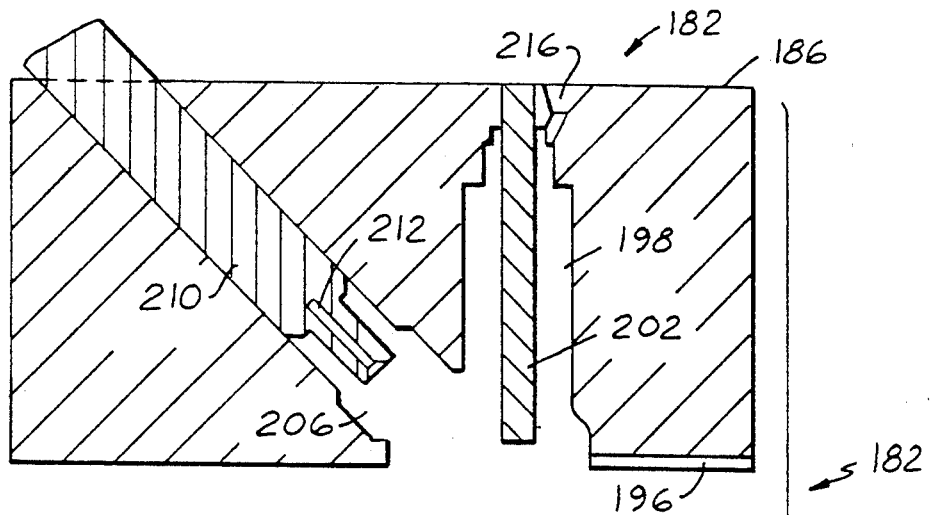
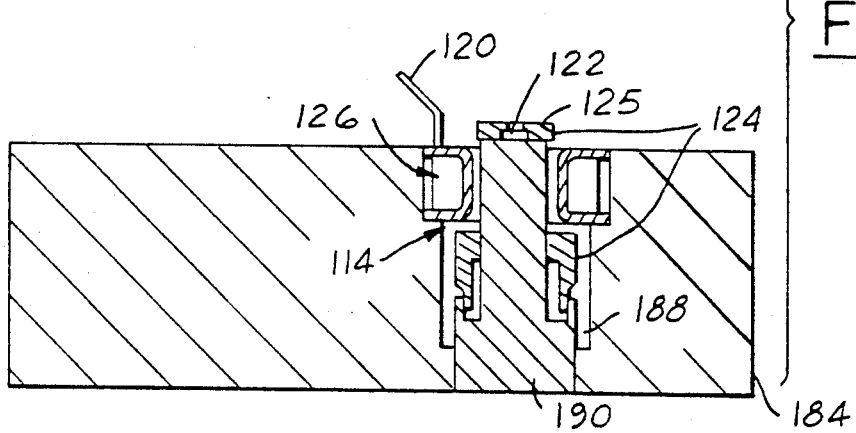
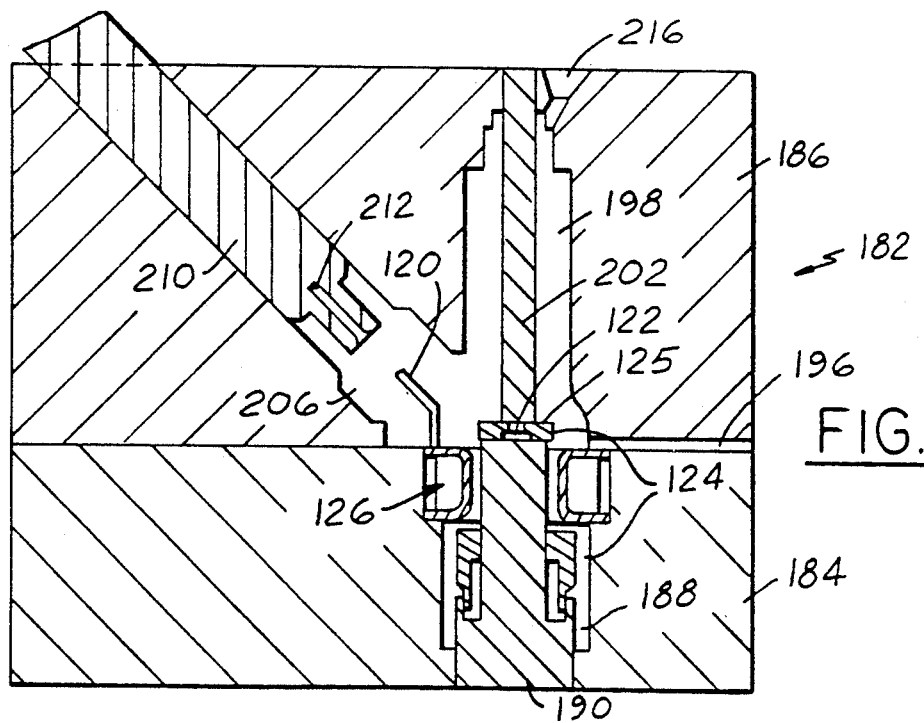

MOLDED FUEL INJECTOR AND METHOD FOR PRODUCING

BACKGROUND OF THE INVENTION

The field of the invention relates to electromagnetic fuel injectors, fuel rails and processes for fabricating same.

For motor vehicle applications in particular, it is known to mechanically couple a plurality of electromagnetic fuel injectors between a fuel rail and an intake manifold of an internal combustion engine. In response to an electronic drive signal, the actuated fuel injector passes fuel from the fuel rail into the intake manifold for a predetermined time. A typical fuel injector, which is illustrated herein as Prior Art FIG. 1, includes housing 12 constructed of an electromagnetic permeable material and having a lower housing 14 crimped to an upper housing 16. Lower housing 14 is fabricated by a conventional cold heading and machining process which forms fuel passageway 18 and cavity 20 for receiving coil bobbin assembly 22 therein. Electrical contacts or terminals 24 pass through upper housing 16 from coil bobbin assembly 22 and are molded through plastic cap 26. Placement of "O" ring 28 and "O" ring 30 on respective lower housing 14 and upper housing 16 within cavity 20 is required to seal coil bobbin assembly 22 and electrical contacts 24 from fuel passageway 18.

Continuing with Prior Art FIG. 1, armature 34 is slidably, axially mounted within fuel passageway 18 and biased against spring 32. Armature 34 is connected to stem 36 which is axially positioned within sleeve 42 and includes conical end 38. Lower housing 14 is crimped to sleeve 42. Sleeve 42 has a conical seat 46 formed around valve opening 50 for mating with conical end 38 of stem 36 thereby forming a needle and seat valve. Fuel passageway 18 communicates with sleeve 42 and extends through upper housing 16 to fuel connector 52 which mates with a fuel rail (not shown).

During operation of the above described prior art device, electrical actuation of coil bobbin assembly 22 induces a magnetic field through a magnetic core defined by lower housing 14 and upper housing 16. This induced magnetic field couples to armature 34 deflecting it against spring 32 thereby opening the needle and seat valve.

The inventor herein has recognized numerous disadvantages of the prior art device described above. For example, several "O" rings and corresponding assembly steps are required to seal coil bobbin assembly 22 and electrical contacts 24 from fuel passageway 18. In addition, complicated processing steps are required such as cold heading and machining lower housing 12 to form fuel passageway 18 and cavity 20. Cumbersome crimping steps are also required to assemble lower housing 12 to upper housing 14 and sleeve 42. The magnetically permeable housing is also susceptible to corrosion in typical under hood environments.

SUMMARY OF THE DISCLOSURE

An object of the invention described herein is to provide a fuel injector requiring fewer fabricating and assembly steps than heretofore possible and eliminating the need to seal the electrical fuel injector portions, including the coil bobbin assembly and electrical contacts, from the fuel passageways.

The above described object is achieved, disadvantages of prior approaches overcome, and other objects and advantages obtained by providing the electromagnetic fuel injector, and process for fabricating such fuel injector, as claimed herein. In one aspect of the invention, the electromagnetic fuel injector comprises: a magnetic core comprised of a magnetic permeable material having an opening; an electric coil assembly positioned within the magnetic core opening for coupling magnetic energy to the magnetic core, the coil assembly including a wire coil having a pair of electrical contacts extending therefrom; spacing means comprised of injection molded plastic for hermetically sealing the coil assembly within the magnetic core and also forming a fuel injector housing surrounding the magnetic core and the coil assembly with the electrical contacts extending through the housing, the spacing means also forming a fuel passageway therein which is sealed from the coil assembly and the electrical contacts; an armature comprised of a magnetic permeable material coupled to the fuel passageway and magnetically responsive to the magnetic core; and valve means mechanically responsive to the armature and coupled to fuel passageway for controlling fuel flow.

In another aspect of the invention, the electromagnetic fuel injector is formed by the processing steps of: inserting an electric coil assembly within a magnetic core and positioning both within a separable mold wherein the electric coil assembly includes a wire wound on a bobbin having a pair of electrical contacts extending therefrom; inserting a first removable pin into an opening concentrically formed in both the magnetic core and the coil assembly; inserting a second removable pin to encapsulate the pair of electrical contacts; injecting plastic into the mold for hermetically sealing the coil assembly within the magnetic core and also forming a fuel injector housing surrounding the coil assembly and the magnetic core; removing the first pin to define a fuel passageway and removing the second pin to define an electrical connection for the pair of electrical contacts which is external to the housing and sealed from the fuel passageway; removing the separable mold to define an integrally formed fuel injector housing with a fuel passageway, magnetic core, and hermetically sealed electric coil assembly positioned therein; inserting an armature comprised of a magnetic permeable material into the fuel passageway; and coupling a needle and seat valve to the armature and to the fuel passageway for controlling fuel flow.

An advantage of the above aspect of the invention is that the electric coil assembly and associated electrical contacts are hermetically sealed and isolated from the fuel passageway by injection molding plastic during the fabrication process without the need for installing numerous "O" rings or bonding, and sealing the electrical contacts which are disadvantages of prior approaches. The coil assembly is completely surrounded with the molded plastic, and the molding provides a separate fuel path, which eliminate any interfaces which would otherwise require "O" rings or bonding. Still another advantage is that the fuel injector housing is integrally formed from the injection molded plastic thereby eliminating the prior approach processing disadvantages of cold heading, machining, and crimping housing portions together. Another advantage is that the need for a magnetically permeable housing to create the magnetic core and the inherent disadvantage of susceptibility to corrosion is also eliminated.

BRIEF DESCRIPTION OF THE DRAWINGS

The objects and advantages described herein will be more fully understood, and others will become apparent, by reading an example of an embodiment in which the invention is used to advantage, referred to herein as the Preferred Embodiment, with reference to the drawings wherein:

FIG. 4 illustrates placement of various fuel injector components shown in FIGS. 3A-3B within a two piece mold for purposes of describing various fabricating steps;

FIG. 5 is an additional illustration of the two piece mold shown in FIG. 4 provided for Purposes of describing the process steps herein.

DESCRIPTION OF THE PREFERRED EMBODIMENT

Figure 2:
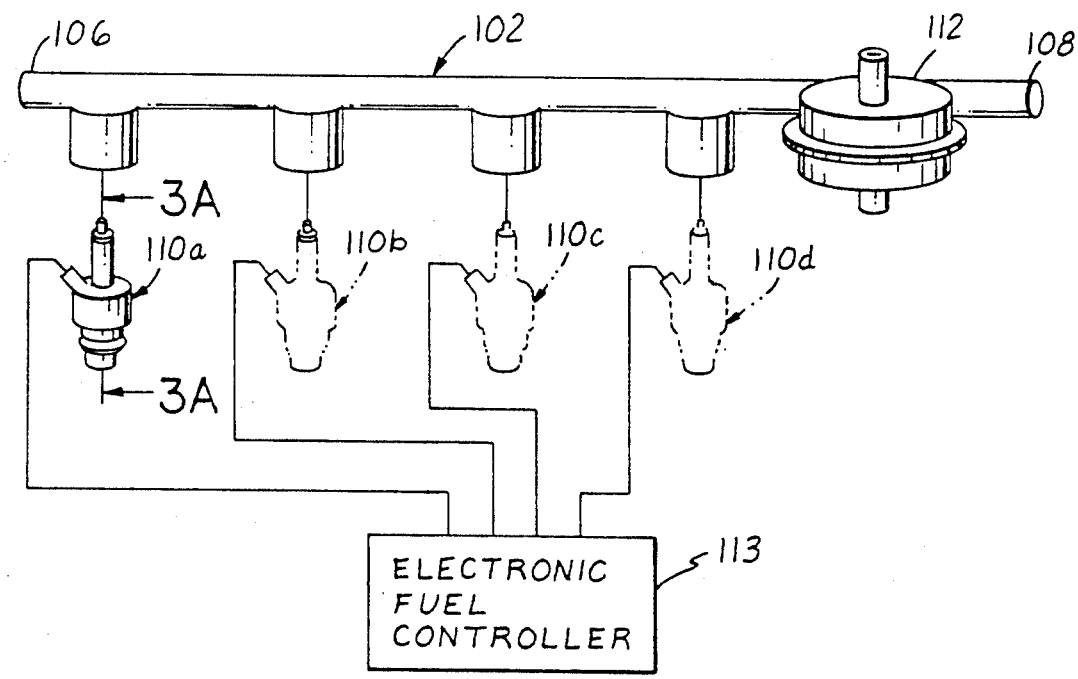
FIG. 2 is a perspective view of a plurality of fuel injectors, in which the invention is used to advantage, shown coupled to a conventional fuel rail and pressure regulator valve.

Referring first to FIG. 2, fuel rail 102 is shown for illustrative purposes having a plurality of fuel injector connectors 104a-104d (four, in this particular example) for coupling to respective fuel injectors 110a-110d one of which is described in greater detail later herein. Fuel rail 102 also includes fuel inlet 106, coupled to a source of fuel such as a fuel pump (not shown), and fuel outlet 108 for returning fuel to a fuel supply or fuel tank (not shown). Conventional pressure regulator 112 is shown coupled to fuel rail 102 for maintaining a desired fuel pressure therein. In this particular example, fuel injectors 110a-110d are electronically actuated by conventional fuel controller 113 for metering desired quantities of fuel, at desired times, from fuel rail 102 into an intake manifold (not shown) of an internal combustion engine (not shown).

Figure 1:
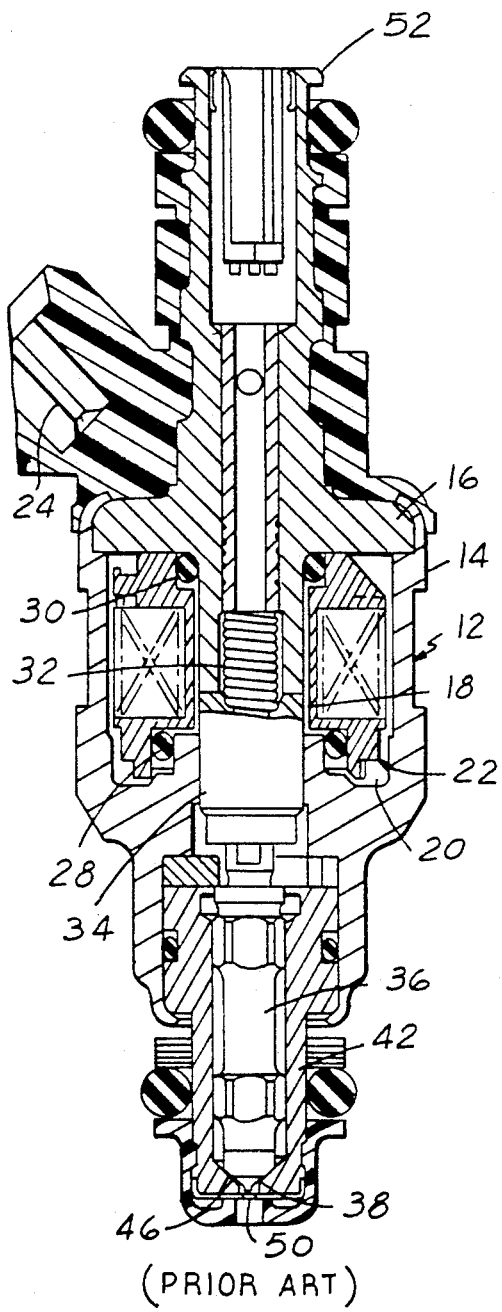
FIG. 1 is a cross-sectional view of a prior art fuel injector described further in the Background Of The Invention section.
Figure 3A:
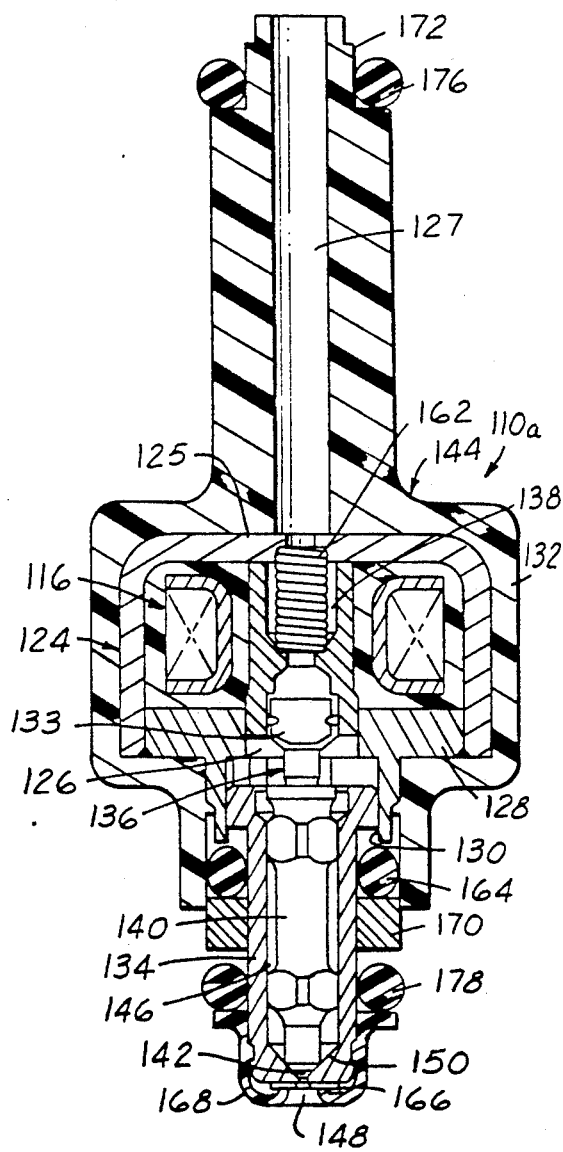
FIG. 3A is a cross-sectional view of a single fuel injector taken along line 3A—3A in FIG. 2.
Figure 3B:
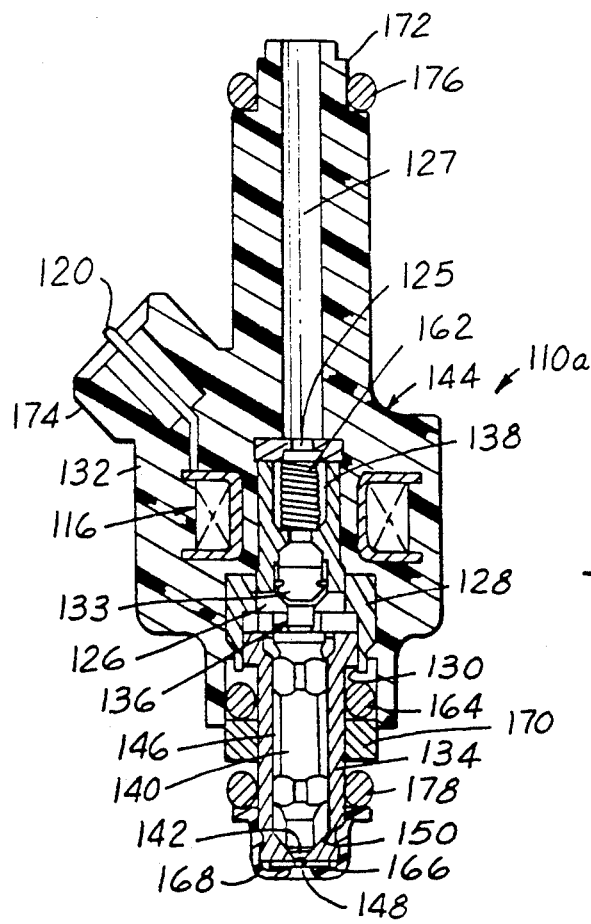
FIG. 3B is a view of FIG. 3A rotated 90°.

A cross-sectional view of fuel injector 110a is shown in FIG. 3A and FIG. 3B. In this particular example, a core fuel injector assembly is shown including coil bobbin assembly 116 inserted within a stator or magnetic core 124. Coil bobbin assembly 116 includes a wire wound about a bobbin and having opposing ends connected to pair of electrical contacts 120 for connection to electronic fuel controller 113 (FIG. 2).

As described in greater detail later herein with particular reference to FIGS. 4-6, injection molded plastic 132 seals coil bobbin assembly 116 within magnetic core 124, and also forms both housing 144 and axial fuel passageway 126. Injection molded plastic 132 also seals coil bobbin assembly 116 and contacts 120 from any fuel flow, such as through axial fuel passageway 126, thereby eliminating the need for a plurality of "O" rings and additional assembly processes which were inherent in prior approaches. In addition, integrally forming a plastic housing around a magnetic core eliminates the need for a magnetic permeable housing which is prone to corrosion and the associated crimping, cold heading, and machine processes which were previously described disadvantages of Prior approaches.

Continuing with FIGS. 3A-3B, magnetic core 124, constructed of a magnetic permeable material, includes U-shape strap 125 having its open end welded to magnetic permeable assembly 128 which has axial bore 130 formed therein. Sleeve 134, having axially bored fuel passageway 146 and valve opening 148 circumscribed by conical seat valve 150, is shown coupled to axial bore 130 of magnetic core 124. Armature assembly 136 is shown including rotor or armature 138, and stem 140 having conical needle 142 formed thereon for mating with conical seat valve 150. Armature 136 is shown including recess 138 for positioning return spring 162 therein. Armature assembly 136 is shown positioned within sleeve 134 such that armature 138 resides within axial fuel passageway 126 of magnetic core 124 and is biased away from upper leg 125 of magnetic core 124 by return spring 162. Silicon etched nozzles 166, described in U.S. Pat. No. 4,907,748 the specification of which is incorporated herein by reference, is shown communicating with valve opening 148 of sleeve 134 and attached thereto by retaining cap 168.

When fuel injector 110a is coupled to an internal combustion engine, neck 172 of housing 144 is inserted into appropriate fuel rail connector 104a and sealed therein by "O" ring 176. Similarly, retaining cap 168 of fuel injector 110a is inserted into the engine intake manifold (not shown) and sealed thereto by "O" ring 178.

During fuel injector operation, electronic fuel controller 113 demands a predetermined amount of fuel for delivery to the internal combustion engine by electronically actuating coil bobbin assembly 116 a predetermined time via electrical contacts 120. In response, the magnetic field coupled to magnetic core 124 via coil bobbin assembly 116 axially displaces armature 138 in an upward direction against return spring 162 thereby displacing needle 142 from conical seat valve 150. Fuel then flows through fuel passageway 127 of housing 144, axial fuel passageway 126 of core fuel injector assembly 114, axial fuel Passage 146 and valve opening 148 of sleeve 134, and silicon etched nozzles 166, into the intake manifold (not shown). When electrical power is removed from coil bobbin assembly 116, return spring 162 downwardly deflects armature assembly 136 thereby seating needle 142 against valve opening 148 to stop fuel flow through the injector. Since coil bobbin assembly 116 and contacts 120 are hermetically sealed from the fuel passageways by injection molded plastic 132, as previously described, fuel flowing through the passageways cannot come in contact with any electrical components. Should the bond between injection molded plastic 132 and magnetic core 124 develop a slight gap, fuel would still not come in contact with any electrical components, but would simply flow around magnetic core 124 and return to the fuel passageways (126, 127, or 146).

The process steps for producing fuel injector 110a are now described with reference to FIGS. 4-6, and continuing reference to FIGS. 3A-3B. Two piece injection mold 182 is shown having lower mold 184 and upper mold 186 in the open position. Lower mold 184 is shown having recess 188 with removable pin 190 inserted therein. Core fuel injector assembly 114 is shown positioned over pin 190 within recess 188. As described previously herein, core fuel injector assembly 114 includes coil bobbin assembly 116, having wire 118 wound on bobbin 119 and contacts 120 coupled to opposing ends of wire 118, and positioned within magnetic core 124. Pin 190 is shown inserted through fuel passageway 126 of core fuel injector assembly 114 and biased against upper leg 125 of magnetic core 124.

Upper mold 186 is shown including injection inlet opening 196 communicating with recess 198 which has removable pin 202 disposed therein. Recess 198 is shown communicating with recess 206 which has removable pin 210 disposed therein. Pin 210 is shown having indent 212, for partially surrounding electrical contacts 120 of fuel injector 110a during a subsequent fabrication step (see FIGS. 5 and 6). Conventional vent 216 is also shown communicating with recess 198.

Referring now to FIG. 5, two piece injection mold 182 is shown in the mated position with pin 202 displaced against upper leg 125 of magnetic core 124 and axially aligned with pin 190. Recess 198 is shown communicating with recess 188. It is seen that recesses 188, 198, and 206 will provide mold surfaces for forming housing 144 of fuel injector 110a.

Figure 6:
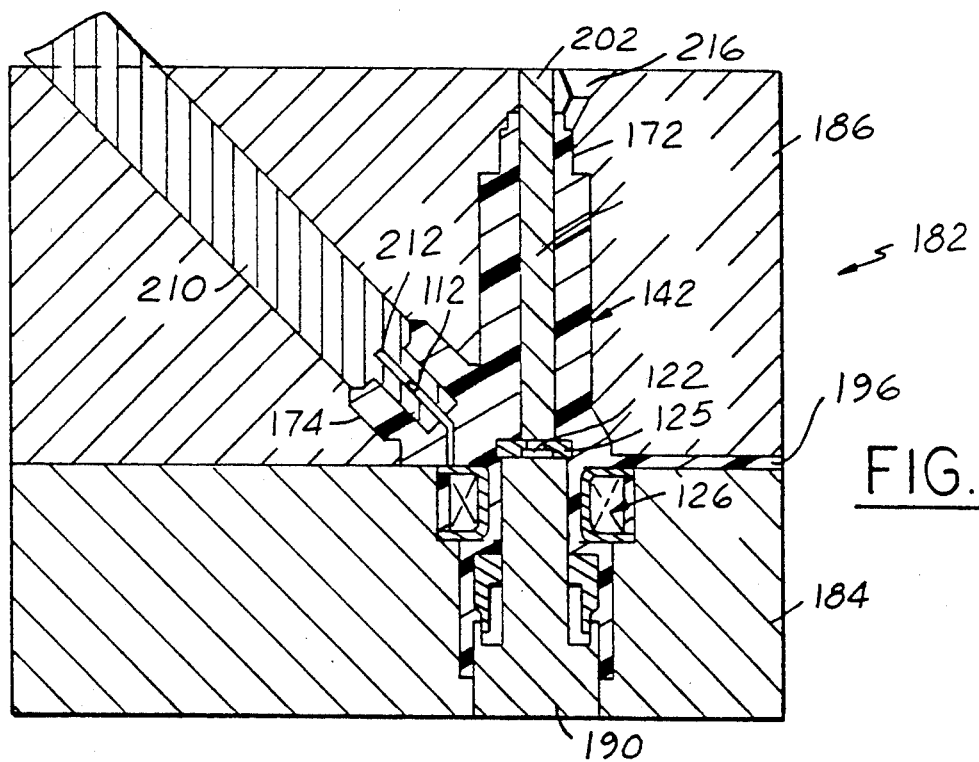
FIG. 6 is an additional illustration of the two piece mold shown in FIG. 4 provided for purposes of describing the process steps herein.

Referring now to FIG. 6, Pin 210 is shown inwardly displaced such that indent 212 surrounds electrical contacts 120. Plastic as been injected through opening 196 to form housing 144 including neck 172, and connector cap 174 which surrounds electrical contacts 120. Coil bobbin assembly 116 and magnetic core 124 are shown hermetically sealed within housing 142 by the injected molded plastic. Continuing with FIG. 6 and also referring to FIG. 3B, removal of pin 190 and pin 202 respectively defines axial fuel passageway 126 and axial fuel passage 146 which in turn communicate with each other through fuel opening 122 in upper leg 125 of magnetic core 124.

An assembly process then follows which is more easily understood with reference to FIGS. 3A-3B. Silicon nozzle assembly 166 is bonded to sleeve 134 in communication with valve opening 148. Retaining cap 168 is then crimped onto sleeve 134 and "O" ring 178 positioned on sleeve 134. Armature assembly 136 having return spring 162 coupled to armature 138 is inserted into sleeve 136 which is then axially inserted into fuel passageway 126 of core fuel injector assembly 114. "O" ring 164 and retaining ring 170 are positioned for sealing sleeve 134 to housing 144 and completing the fabrication process.

In addition to the advantages described above, it is readily apparent that these fabrication processes eliminate the prior art need for cold heading, machining and crimping. A more reliable fuel injector results requiring fewer assembly steps and sealing components such as "O" rings than heretofore possible.

This concludes the Description of the Preferred Embodiment. The reading of it by those skilled in the art will bring to mind many alterations and modifications without parting from the spirit and scope of the invention. For example, the fuel injector claimed herein may be used to advantage with magnetic cores and coil bobbin assemblies different from the particular configurations shown in the Description of the Preferred Embodiment. Accordingly, it is intended that the scope of the invention be limited only by the following claims.

What is claimed is:

1. An electromagnetic fuel injector, comprising:
 a magnetic core comprised of a magnetic permeable material having an axial cavity and axial opening;
 an electric oil assembly adapted for positioning within said magnetic core cavity and for coupling magnetic energy to said magnetic core;
 molded means comprised of injection molded plastic for permanently positioning said magnetic core around said coil assembly and for forming a fuel passageway through said coil assembly and through said magnetic core opening, said molded means also hermetically sealing said coil assembly from said fuel passageway;
 an armature comprised of a magnetic permeable material coupled to said fuel passageway and magnetically responsive to said magnetic cores; and
 valve means communicating with said fuel passageway and mechanically responsive to said armature for controlling fuel flow in response to application of electrical energy to said assembly.

2. The fuel injector recited in claim 1 wherein said molded means totally surrounds said coil assembly.

3. The fuel injector recited in claim 1 wherein said coil assembly includes a wound wire and associated electrical terminals which are physically isolated from said fuel flow by said molded means.

4. The fuel injector recited in claim 1 wherein said magnetic core is substantially a U-shape.

5. The fuel injector recited in claim 1 wherein said armature is movable in an axial direction.

6. An electromagnetic fuel injector for controlling furl form a fuel supply, comprising:
 a magnetic core comprised of a magnetic permeable material having an opening;
 an electric coil assembly positioned within said magnetic core opening for coupling magnetic energy to said magnetic core, said coil assembly including a wire coil having a pair of electrical contacts extending therefrom;
 spacing means comprised of injection molded plastic for hermetically sealing said coil assembly within said magnetic core opening and also forming a fuel injector housing surrounding said magnetic core and said coil assembly with said electrical contacts extending through said housing, said spacing means also forming a fuel passageway through said coil assembly and said magnetic core opening which is hermetically sealed from coil assembly;
 an armature comprised of a magnetic permeable material coupled to said fuel passageway and magnetically responsive to said magnetic core; and
 valve means mechanically responsive to said armature and coupled to said fuel passageway for controlling fuel flow.

7. The fuel injector recited in claim 6 wherein said magnetic core further comprises U-shaped strap having a magnetically permeable bar welded across an open end of said U-shaped strap, said U-shaped strap defining said magnetic core opening and said bar includes a concentric hole aligned with said fuel passageway for placement of said armature therethrough.

8. The fuel injector recited in claim 6 wherein said armature is movable in an axial direction.

9. The fuel injector recited in claim 6 further comprising: a stem having one end coupled to said armature and an opposing end with a conical tip; and a cylindrical sleeve communicating with said fuel passageway for insertion of said stem therein, said cylindrical sleeve including a conical seat for mating with said conical tip of said stem.

* * * * *